United States Patent [19]
Munier et al.

[11] 3,777,565
[45] Dec. 11, 1973

[54] MAGNETIC CONVERTER FOR WATER METERS

[75] Inventors: Ronald A. Munier, New Providence; Charles Che Ling, Newark, both of N.J.

[73] Assignee: Gamon-Calmet Industries, Inc., Newark, N.J.

[22] Filed: Aug. 3, 1972

[21] Appl. No.: 277,863

[52] U.S. Cl. ............................................. 73/258
[51] Int. Cl. ........................................... G01f 3/08
[58] Field of Search ................................... 73/258

[56] References Cited
UNITED STATES PATENTS

| | | | |
|---|---|---|---|
| 3,213,687 | 10/1965 | Forgues | 73/258 X |
| 2,960,074 | 11/1960 | Zavada | 73/258 |
| 3,435,679 | 4/1969 | Davis | 73/258 |
| 2,766,733 | 10/1956 | Jacobson | 73/258 X |
| 2,458,965 | 6/1923 | Bassett | 73/258 X |

Primary Examiner—Herbert Goldstein
Attorney—Daniel H. Bobis

[57] ABSTRACT

Conversion means are provided to enable the ready conversion of mechanically coupled water meters to magnetically coupled operation, and include magnetic drive means, and bearing and support means therefor, which are substituted for the mechanical coupling of the meter, and substantially fluid tight, magnetically drivable register means which are sustituted for the mechanically drivable register means of the meter.

1 Claim, 7 Drawing Figures

PATENTED DEC 11 1973 3,777,565
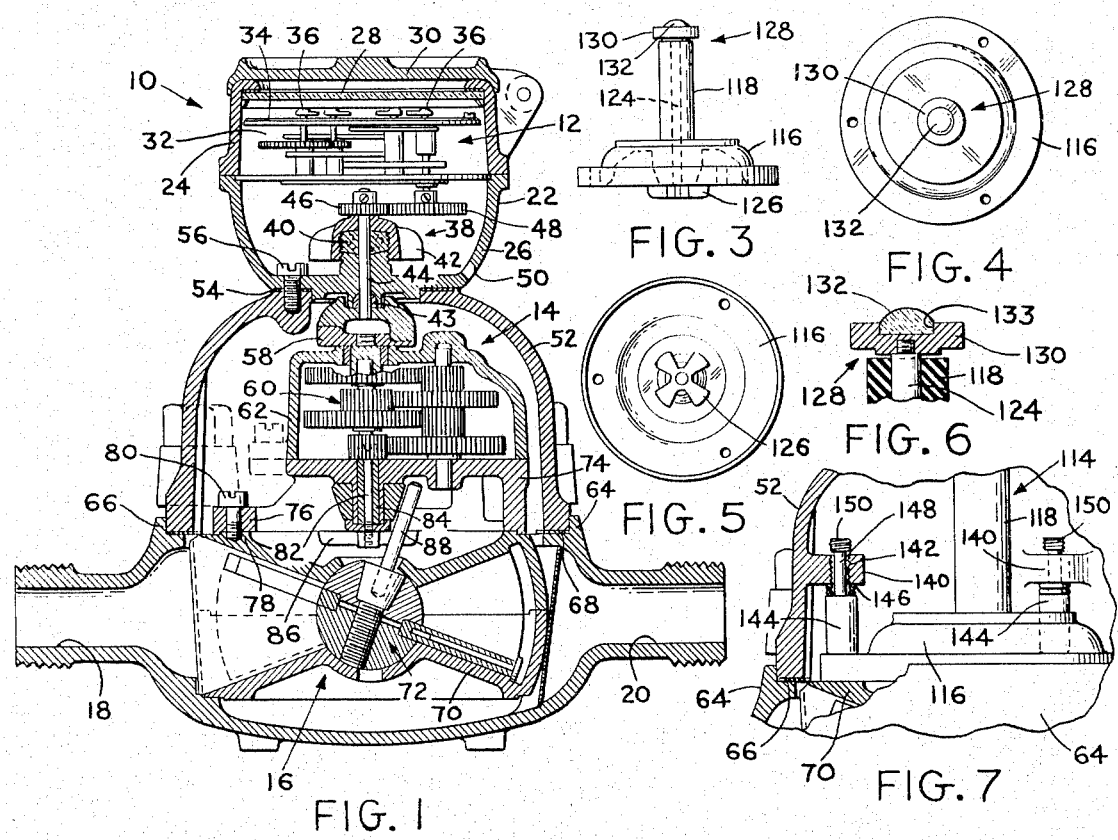
FIG. 3
FIG. 4
FIG. 5
FIG. 6
FIG. 7
FIG. 1
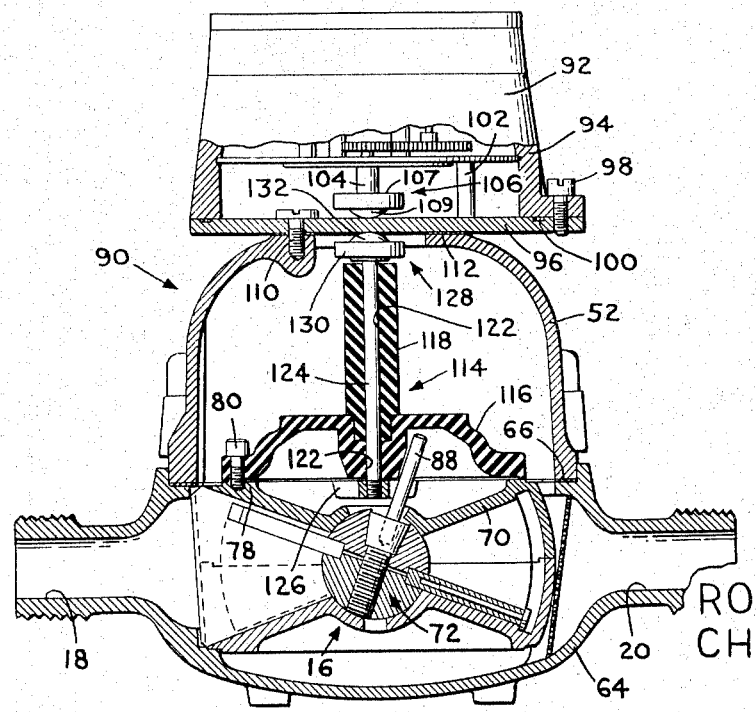
FIG. 2
RONALD A. MUNIER
CHARLES CHE LING
INVENTORS
BY Daniel H. Bobis
Atty

MAGNETIC CONVERTER FOR WATER METERS

This is a continuation; of application, Ser. No. 783,818 filed Dec. 16, 1968, now abandoned.

BACKGROUND OF THE INVENTION

This invention relates to conversion means for converting mechanically coupled water meters to magnetically coupled operation.

Although, the mechanically coupled water meters of the prior art provide generally satisfactory service, there are certain significant disadvantages inherent in the operation thereof. More specifically, it may be understood that the same require the use of relatively heavy and complex drive gear train assembles to drive the meter register, and a relatively complex stuffing box assembly to inhibit the leakage of water into the register box assembly. Heavy gear trains and stuffing box produce high friction and consequently lower accuracy. In addition, and despite said stuffing box, some leakage does occur into the register box assembly and must be enabled to drain therefrom with resultant possibility of damage to the property of the meter user.

Replacement of such mechanically coupled meters by the more modern magnetically coupled meters would, of course, eliminate these disadvantages, but it is believed clear that such would represent a most expensive solution to the problem, and especially in instances wherein many of the meter components are in good working order.

OBJECTS OF THE INVENTION

It is, accordingly, an object of this invention to provide conversion means for enabling the convenient and relatively inexpensive conversion of mechanically coupled water meters to magnetically coupled operation.

It is another object of this invention to provide meter conversion means as above which enable the utilization of a magnetically driven, substantially fluid-tight register box assembly to thus eliminate the problem of leakage therewith and therefrom.

It is another object of this invention to provide conversion means as above which enable the retention of many of the major components of the meter to thus further reduce the cost of meter conversion.

A further object of this invention is the provision of meter conversion means as above which, through the provision of a magnetic coupling in place of a mechanical coupling, significantly enhance the reliability and accuracy of the meter as converted.

BRIEF DESCRIPTION OF THE INVENTION

As currently preferred, the meter conversion means of the invention comprise a substantially fluid-tight register box assembly which is drivable through a driven magnet included in the register box. A meter drive spindle, including a drive magnet which magnetically couples with the driven magnet of the register box assembly, is substituted for the drive gear train of the meter; and bearing and support means are provided to rotatably support the meter drive spindle and maintain the rotation thereof true. With the exception of the mechanically driven register box assembly and the drive gear train and bracket of the mechanically coupled meter, all of the major working components thereof are retained, and the conversion means of the invention are specifically designed to facilitate the ready and convenient conversion thereby of a mechanically coupled meter.

DETAILED DESCRIPTION OF THE DRAWINGS

FIG. 1 is a longitudinal cross-sectional view taken through a mechanically coupled water meter of the prior art.

FIG. 2 is a longitudinal cross-sectional view taken through a meter in the nature of that of FIG. 1 after the conversion thereof by the conversion means of the invention to magnetically coupled operation.

FIG. 3 is a side elevational view of the meter conversion means of the invention.

FIG. 4 is a top plan view of the meter conversion means of FIG. 3.

FIG. 5 is a bottom plan view of the meter conversion means of FIG. 3.

FIG. 6 is a longitudinal cross-sectional view taken through the upper portion of the magnetic drive spindle means of the meter conversion means of FIG. 3.

FIG. 7 is a side elevational view, with portions in cross-section, of a mechanically coupled water meter of somewhat different nature than that of FIG. 1 after the conversion thereof to magnetically coupled operation by the conversion means of the invention.

DETAILED DESCRIPTION OF THE INVENTION

Referring now to FIG. 1, a mechanically driven water meter constructed and operative in accordance with the teachings of the prior art is indicated generally 10 and will be described in some detail to provide a comprehensive background of the description of this invention.

The water meter 10 is of a type easily purchasable on the open market or presently in use in many residential, industrial and commercial water system installations. The water meter 10 comprises a register assembly 12, a gear train assembly 14 and a meter drive assembly 16, all of which are mechanically interconnected as described in greater detail herein below. The meter drive assembly 16 includes water inlets and outlets, as indicated at 18 and 20, respectively, and it may be understood that the flow of water under pressure from the inlet 18 to the outlet 20 will be effective to operate the meter drive assembly 16 to drive the meter register assembly 12, through the mechanically interconnected gear train assembly 14, to periodically advance the former to provide indicia of the amount of water utilized.

Referring now in greater detail to the register assembly 12, the same comprises a register box 22 which includes a register box ring 24, a register cup 26, a transparent register box glass 28 and a register box cover 30 disposed thereover as shown.

Disposed within the register box 22 is a register 32 which includes a register dial 34 and register dial hands 36 rotatably mounted thereover, whereby the respective positions of the said dial hands relative to the said dial, as observed through the transparent register box glass 28 upon removal of the register box cover 30 will, of course, be indicative of the quantity of water utilized.

A stuffing box assembly 38 is provided as shown within the register cup 26 and comprises a stuffing box packing 40 disposed within a stuffing box nut 42, and a stuffing box thrust block 43 disposed at the lower extremity of the said stuffing box assembly. A stuffing box spindle 44 extends upwardly as shown through the stuffing box assembly 38, and a stuffing box change gear 46 is fixedly secured to the upper extremity of the said spindle so as to be rotatable therewith.

A register change gear 48 is meshed with the stuffing box change gear 46 and is operative to drive the register 32 upon driven rotation thereof by the said stuffing box change gear. A drain hole 50 is provided to extend as shown through the register cup 26 for purposes described in detail herein below.

The gear train assembly 14 is disposed within a pressure vessel formed by a main case cover 52, and the register assembly 12 is mounted as shown atop the said main case cover through the medium of a register cup gasket 54 disposed there between and register cup attachment screws 56 extending therebetween.

The gear train assembly 14 comprises an intermediate driving arm 58 which is fixedly secured to the lower extremity of the stuffing box spindle 44 so as to be operative to drivingly rotate the latter, and a large plurality of enmeshed drive gears, as indicated generally at 60, which are disposed as shown within a gear train case 62 and are, of course, operative to drivingly rotate the intermediate driving arm 58.

The main case is indicated at 64 and comprises a mounting flange found thereon as indicated at 66. The main case cover 52 is disposed atop the main case 64, as illustrated, through the use of the mounting flange 66, and a main case gasket 68 is disposed as shown therebetween for obvious sealing purposes to provide a substantially water-tight main case-main case cover assembly.

A disc chamber member 70 is disposed as shown within the main case 64 through the use of complementally shaped mounting flanges found thereon, and a disc assembly, as indicated generally at 72, is disposed within the disc chamber member for driven nutation therewithin in obvious manner upon the flow of water from the main case inlet 18 to the main case outlet 20.

A gear train bracket 74 is fixedly disposed as shown atop the disc chamber member 70 through the use of complementally shaped mounting flanges, as indicated at 76 and 78, and is secured thereto by means of gear train bracket screws 80 extending therebetween.

A gear train driving spindle and pinion assembly is indicated at 82 and may be seen to extend downwardly, with freedom for rotation, through a bushing 84 in the gear train bracket 74. A gear train driving pawl 86 is fixedly secured to the lower extremity of the said spindle and pinion assembly and may be seen to extend into cooperative association with the disc spindle 88 of the disc assembly 72, whereby is believed made clear that the nutation of the letter will be converted into rotation of the driving spindle and pinion assembly 82 to drive the gear train 60 and periodically advance the register assembly 12 to indicate the quantity of water utilized.

Although mechanically coupled water meters of the type depicted in FIG. 1 and described in detail directly herein above have been in use and provided generally satisfactory operating results for many years, it may be noted that there are certain significant disadvantages inherent in the design, construction and manner of operation thereof, more specifically, and referring again to FIG. 1, it may be understood that the gear train 60 utilized therein is of relatively heavy, complicated and thus costly construction, and that the reliability thereof over long operational periods can become questionable. In addition, it is believed clear that since the spindle 44 must, of necessity, penetrate the water-pressure-containing casing formed in part by the main case cover 52, it becomes necessary to provide the relatively complex and costly stuffing box assembly 38 to prevent the undesirable flow of water into the register assembly 12, and further, that despite the provision of such stuffing box assembly some leakage of this nature will occur to require the provision of the drain hole 50 to prevent flooding of the register assembly. Of particular significance, however, is the fact that this essential leakage from the drain hole 50 can and does cause damage to the property of the water meter user. Also, the heavy gear train and stuffing box produce friction which impairs accuracy.

Although all of these disadvantages of the mechanically coupled water meters of the prior art can, of course, be readily negated by the replacement thereof with the more modern magnetically coupled meters which are, in themselves, of course, now well known in the art, it is believed clear that this represents a very expensive solution to the problem, and especially in instances wherein the meter register and disc chamber assemblies continue to perform in reasonably accurate and satisfactory manner. Accordingly, it is as set forth hereinabove, an object of this invention to provide simple, reliable, leak-proof and generally inexpensive conversion means whereby the mechanically coupled water meters of the prior art may be readily and conveniently converted to magnetically coupled operation for more accurate and trouble-free operation.

Referring now to a first embodiment of this invention as depicted in FIG. 2, a water meter converted to magnetically coupled operation indicated generally at 90 and may be seen to comprise a register assembly 92.

The register assembly 92 includes a register box subassembly 94 disposed as shown atop a fluid-tight register plate 96 and secured thereto by register box screws 98. The register plate is made from any suitable nonmagnetic material in the nature, for example, of brass. An O-ring 100 is disposed as shown between the said sub-assembly and fluid-tight place for obvious purposes and a register supporter 102 is provided to support the register from the plate 96.

Included in the register assembly 92 is a magnetic spindle assembly 104 which extends downwardly therefrom as shown and terminates in a drive magnet assembly 106, it being made clear that driven rotation of this magnetic spindle assembly will, of course, be effective to advance the register assembly.

As described in greater detail hereinbelow, the driven magnet assembly comprises a permanent magnet 107 and a low friction insert 109, such as a polytetra fluoroethylene material, similar low friction plastic or the like materials carried therefrom and extending into light surface contact with the upper surface of the register plate 96.

The register assembly 92 is disposed as shown atop the main case cover 52 and secured thereto by register plate screws 110 extending therebetween. A fiber gasket 112 is disposed as shown between the register plate 96 and the main case cover 52 to maintain the requisite fluid-tight condition of the latter and prevent water leakage.

As converted, the water meter 90 may be seen to incorporate a magnetic drive assembly, as indicated generally at 114, which replaces the gear train assembly 14 of the mechanically coupled meter 10 of FIG. 1.

More specifically, the magnetic drive assembly 114 of FIG. 2 comprises a generally torus-like control bearing 116 which is preferably made of a durable, readily available material in the nature of hard rubber. The control bearing 116 replaces the gear train bracket 74 of FIG. 1 and may be seen to be disposed, in the manner of the latter, atop the mounting flange 78 of the disc chamber member 70 and attached thereto by the attachment screws 80 extending therebetween. A spindle support 118, which is also preferably made of hard rubber, is supported as shown from the control bearing 116 by the press-fitting of the stepped, lower extremity of the former into a stepped bore provided therefor in the latter, and aligned bores 120 and 122 may be seen to extend through the said control bearing and spindle support, respectively.

A somewhat extended magnetic drive spindle 124 extends as shown with freedom for rotation through the respective bores 120 and 122, and a driving arm 126 is fixedly secured to the lower extremity of the drive spindle 124 to extend therefrom into cooperative association with the disc spindle 88 in the manner described in detail hereinabove with regard to the driving arm 86 of the mechanically coupled meter of FIG. 1.

A drive magnet assembly 128 is affixed as shown to the upper extremity of the magnetic drive spindle 124 so as to be rotatable therewith. As best seen in FIG. 6, the drive magnet assembly 128 comprises a permanent magnet 130 which is affixed to the drive spindle 124 so as to be rotatable therewith. The drive magnet assembly 128 comprises a permanent magnet 130 which is affixed to the drive spindle 124 by the tightening of the latter into a complementally threaded bore provided therefor in the permanent magnet 130, and an insert 132 which is of any suitably low friction material in the nature of plastic, and which is press-fitted into a mounting aperture 133 provided therefore in the said permanent magnet 130. In the manner of the insert 109 of the driven magnet assembly 106, it may be understood that the insert 132 of the drive magnet assembly 128 extends into light surface contact with the lower surface of the register plate 96.

The respective permanent magnets 107 and 130 are, of course, of opposite polarities so that magnetic coupling will be established therebetween through nonmagnetic register plate 96. Accordingly, it may be understood that the rotation of the drive magnet assembly 128, as results from the flow of water from the main case inlet 18 to the main case outlet 20 with attendant mutation of the disc assembly 72 and rotation of the driving arm 126 and magnetic drive spindle 124, will be effective to rotate the driven magnet assembly 106 to periodically advance the register assembly 92 and provide indicia of the quantity of water utilized.

For a representative conversion of a mechanically coupled water meter in the nature of the meter 10 of FIG. 1 to magnetically coupled operation through the use of the meter conversion means of the invention, it is believed clear that many of the components of the former are retained to thus simplify and reduce the cost of the meter conversion procedure. More specifically, it may be understood that, for such conversion, each of the main case 52, the attachment screws 80, the main case 64, the disc chamber member 78 and the disc assembly 72 would be retained in the meter as converted provided, of course, that the same are found to be in proper working order during the performance of the meter conversion.

In the conversion of a mechanically coupled water meter 10 as shown in FIG. 1 to magnetically coupled operation as illustrated in FIG. 2, the main case cover 52 would be removed from the main case 64 and the entire register assembly 10, including the register cup 22, and the entire drive gear assembly 14, including the drive gear bracket 74, removed therefrom. Following this a new register assembly 92 would be affixed atop the main case cover 52, the pre-assembled magnetic spindle assembly 114 affixed to the disc chamber member 78 through the use of the old attachment screws 80, and the main case cover 52 including the new register assembly 92, re-affixed atop the main case 64 to complete the meter conversion process in simple and most expeditious manner.

Referring now to the embodiment of the meter conversion means of this invention depicted in FIG. 7, the same may readily be seen to be markedly similar in most respects to that described in detail hereinabove with regard to FIGS. 2 through 6. Accordingly, it may be understood that like reference characters will be utilized, where applicable, to identify like meter conversion means components.

The meter conversion means of FIG. 7 are designed for use in the conversion of mechanically coupled water meters of another type also easily purchasable on the open market and used extensively in water-system installations. This type of mechanically coupled water meter may be understood to comprise a somewhat shorter main case cover 52 than the meter 10 of FIG. 1, and to utilize a bottom plate wich is affixed to a plurality of mounting flanges formed on the said main case cover, rather than a gear train bracket, to support the drive gear train.

These mounting flanges are indicated at 140 in FIG. 7 and may be seen to comprise threaded apertures 142 extending therethrough. For the mounting of the pre-assembled magnetic spindle assembly 114 in the main case cover 52 of FIG. 7, the former is disposed atop the disc chamber member 70 as shown. Aligned O rings 146 are placed under compression and press screw spacer member 144 against the surface of the control bearing 116 to firmly scat said control bearing 116 against the said disc chamber member 70.

Following this, an attachment screw 148, the upper extremity 150 of which is enlarged as shown and complementally threaded with regard to the threaded aperture 142 of the relevant mounting flange 140, is passed through the said threaded aperture to extend into the spacer member 144 whereupon the threaded extremity 150 is tightened into the threaded aperture 142 to thus firmly maintain the spacer member 144 in the depicted positions thereof, as should be obvious, and maintain the control bearing 116 firmly seated atop the disc chamber member 70, albeit the absence of a direct connection therebetween.

It will be understood, with reference to the embodiment of FIG. 7, that the main case cover 52, the main case 64, the disc chamber member 70 and the disc assembly 72 would be retained for use in the water meter as converted.

Of particular significance with regard to each of the embodiment of the meter conversion means of the invention as described hereinabove, the use of a magnetic coupling enables the provision of a fluid-tight, register box assembly which is completely sealed from the water flowing through the main casing cover to thus completely prevent the leakage of water into the said register box assembly and render unnecessary the provision for leakage water drainage with attendant significant disadvantage as discussed hereinabove. In addition, it may be understood that in each instance, the heavy and complicated meter gear train is replaced by a magnetic spindle assembly and coupling of greatly enhanced reliability. Too, it may be understood that the utilization of the standard magnetic register assembly in the meter conversion procedure renders the converted meter far more adaptable for use in conjunction with modern pneumatically operated and other types of remote meter read-out systems.

It will be understood that the invention is not to be limited to the specific construction or arrangement of parts shown but that they may be widely modified within the invention defined by the claims.

What is claimed is:

1. Conversion means for converting a mechanically coupled fluid meter to magnetically coupled operation, said mechanically coupled fluid meter including a main casing, a casing cover having an opening in an upper extremity thereof, meter drive means, a mechanically driven register box assembly removably secured to said casing cover, and a drive gear train for mechanically coupling said meter drive means through said opening to said register box assembly;

said conversion means comprising:

a magnetically drivable register box assembly including a driven magnet therein the rotation of which controls the operation thereof, said magnetically drivable register box assembly being removably securable to said casing cover in fluid tight relationship with respect to said opening with said driven magnet aligned over said opening;

said magnetically drivable register box assembly being for replacement of said mechanically driven register box assembly;

drive spindle means operatively associated with said meter drive means at one end thereof and provided with a driving magnet at its opposite end thereof; said drive spindle means being for replacement of said drive gear train;

support means for rotatably supporting said drive spindle means above said meter drive means with said one end operatively associated with said meter drive means and said driving magnet in magnetically operative relationship with respect to said driven magnet;

wherein said support means includes a contact bearing which is disposed atop said meter drive means and through which said drive spindle means extends; and wherein said drive gear train of said mechanically coupled fluid meter was removably secured to attachment flanges provided on the interior of said casing cover; and said control bearing is disposed atop said meter drive means and maintained thereon by spacer means which extend between said attachment flanges and the upper surface of said control bearing to firmly press the latter against said meter drive means.

* * * * *